United States Patent Office 3,527,648
Patented Sept. 8, 1970

3,527,648
GLASS COMPOSITIONS
Nils Tryggve E. A. Baak, Ridgefield, Conn., and Charles F. Rapp, Toledo, Ohio, assignors to Owens-Illinois, Inc., a corporation of Ohio
No Drawing. Filed June 17, 1966, Ser. No. 558,278
Int. Cl. C03c 3/08, 3/10
U.S. Cl. 106—54     8 Claims

ABSTRACT OF THE DISCLOSURE

A transparent glass consisting essentially of 78 to 85 mole percent $SiO_2$, 4–9 mole percent $B_2O_3$, 1–6 mole percent $Al_2O_3$, 1–7 mole percent BaO, 0–6 mole percent $TiO_2$ and 0–5 mole percent $Na_2O$. Three times the amount of BaO plus three times the amount of $Na_2O$ plus $TiO_2$ equals at least 6 mole percent. The glass has a low coefficient of thermal expansion of from 10 to $40 \times 10^{-7}$° C. (0–300° C).

---

This invention relates to novel glass compositions. More particularly, the present invention pertains to novel barium borosilicate glass compositions. A specific aspect of the invention relates to producing glasses possessing relatively low to medium thermal coefficient of expansion.

An object of the subject invention is to provide novel glass compositions.

A further object of the present invention is to effect barium-borosilicate glass compositions.

Yet a further object of the instant invention is to provide novel barium borosilicate glasses possessing a relatively low to medium thermal coefficient of expansion.

Still further objects, aspects and advantages will be apparent to those versed in the art from the disclosure and claims which follow.

According to the present invention, there is provided a family of glass compositions having an expansion coefficient (0–300° C.) in the range of 10 to $40 \times 10^{-7}$/° C., with the now preferred range of 20 to $35 \times 10^{-7}$/° C. The glass compositions of the instant invention generally comprise the acidic oxides, $SiO_2$, $Al_2O_3$, and $B_2O_3$, and the alkaline earth oxide, BaO. In addition, the glasses may also include the acidic oxide $TiO_2$ and the alkali oxide $Na_2O$.

The components of the barium borosilicate glass compositions of the present invention, as set forth immediately below, are present in the following proportions, expressed in mole percent: a glass consisting of 78 to 85% $SiO_2$, 8 to 12% $B_2O_3$, 1 to 7% BaO, 1 to 6% $Al_2O_3$, 0 to 5% $Na_2O$, and 0 to 6% $TiO_2$, and wherein 3 times the BaO+3 times the $Na_2O+TiO_2$ is at least 6 mole percent; a glass of 78 to 85% $SiO_2$, 8 to 12% $B_2O_3$, 2 to 7% BaO, and 1 to 6% $Al_2O_3$; a glass of 78 to 85% $SiO_2$, 4 to 9% $B_2O_3$, 1 to 7% BaO, 1 to 6% $Al_2O_3$, 1 to 5% $Na_2O$, and 0 to 6% $TiO_2$; a glass of 78 to 85% $SiO_2$, 4 to 9% $B_2O_3$, 1 to 7% BaO, 1 to 6% $Al_2O_3$, and 1 to 5% $Na_2O$; a glass of 78 to 85% $SiO_2$, 4 to 9% $B_2O_3$, 1 to 7% BaO, 1 to 6% $Al_2O_3$, 1 to 5% $Na_2O$, and 1 to 6% $TiO_2$; and a glass of 78 to 85% $SiO_2$, 4 to 9% $B_2O_3$, 1 to 7% BaO, 1 to 6% $Al_2O_3$, and 1 to 6% $TiO_2$, and wherein 3 times the BaO+$TiO_2$ is at least 6 mole percent.

The now preferred ranges of proportions for the components of the glasses of the present invention include a glass consisting essentially of 80 to 85 mole percent $SiO_2$, 8 to 12 mole percent $B_2O_3$, 4 to 7 mole percent BaO, and 1 to 5 mole percent $Al_2O_3$; a glass composition consisting of 80 to 85 mole percent $SiO_2$, 8 to 10 mole percent $B_2O_3$, 1 to 5 mole percent BaO, 1 to 5 mole percent $Al_2O_3$, and 2 to 4 mole percent $Na_2O$; a glass consisting essentially of 80 to 85 mole percent $SiO_2$, 4 to 7 mole percent $B_2O_3$, 1 to 4 mole percent BaO, 2 to 5 mole percent $Al_2O_3$, 2 to 4 mole percent $Na_2O$, and 3 to 6 mole percent $TiO_2$, and a glass consisting of 80 to 85 mole percent $SiO_2$, 4 to 7 mole percent $B_2O_3$, 1 to 4 mole percent BaO, 2 to 5 mole percent $Al_2O_3$, and 3 to 6 mole percent $TiO_2$.

In preparing the glasses of the above compositional range, the batch ingredients are intimately mixed and heated to such temperature so that all substances are present in the liquid state, thereby enabling the formation of a glass from a homogeneous melt. The batch ingredients were mixed well by hand or in a commercially-available V-blender. The mixed batch materials were conveniently melted in a 90% platinum-10% rhodium crucible in an electrically heated furnace, at a temperature of 1500 to 1600° C., in an air atmosphere, for about 16 to 24 hours. The melts were usually crushed and remelted at 1500 to 1600° C. overnight to insure homogeneity. The low to medium expansion subject glasses prepared from the described melts generally exhibited melting and forming properties suitable for fabricating glassware by standard, conventional techniques. The very low expanding glass can be formed by suitable techniques such as pressing, sintering, etc.

The batch materials employed for preparing the glasses were high purity commercially-available materials and were selected from the following: $SiO_2$ Kona Quartz, $Al_2O_3$, Alcoa A-14, $B_2O_3$ Baker purified reagent and Fisher certified or Baker analyzed reagents: $Na_2CO_3$, $TiO_2$, and $BaCO_3$.

The following tables set forth representative examples of batch components and glasses prepared according to the spirit of the present invention. These examples are not to be construed as limiting the scope of the invention as other functionally equivalent means will be readily apparent to those skilled in the art. epresentative batch constituents for preparing the novel barium borosilicate glasses of the invention are set forth in Table I, immediately below.

TABLE I.—BATCH CONSTITUENTS, GRAMS

| Ingredients | Example | | | | |
|---|---|---|---|---|---|
| | 1 | 2 | 3 | 4 | 5 |
| Kona Quartz | 80.6 | 357.19 | 75.0 | 75.0 | 77.95 |
| Alcoa A-14 | 2.2 | 22.33 | 5.0 | 5.0 | 2.39 |
| $B_2O_3$ | 13.0 | 58.04 | 5.0 | 5.0 | 9.80 |
| $BaCO_3$ | 13.0 | | 57.41 | 10.32 | 7.74 | 7.71 |
| $Na_2CO_3$ | | 30.51 | | | 3.42 | 6.62 |
| $TiO_2$ | | | | 7.0 | 7.0 | |

The above ingredients were melted at 1600° C. overnight in an air atmosphere. The melts were made in a platinum-rhodium crucible, heated in in an electric furnace. The freshly formed glasses were crushed and remelted for about 16 to 20 hours to insure homogeneous glass formation. In Table II, immediately below, the mole percent composition for the batch constituents of Examples 1 to 5 are set forth as Examples 6 to 10 respectively.

TABLE II.—MOLE PERCENT

| Ingredients | Example | | | | |
|---|---|---|---|---|---|
| | 6 | 7 | 8 | 9 | 10 |
| $SiO_2$ | 83.03 | 78.46 | 82.73 | 81.69 | 83.0 |
| $B_2O_3$ | 11.56 | 11.00 | 4.76 | 4.69 | 9.0 |
| BaO | 4.08 | 3.84 | 3.46 | 2.56 | 2.5 |
| $Al_2O_3$ | 1.34 | 2.89 | 3.25 | 3.21 | 1.5 |
| $Na_2O$ | | 3.80 | | 2.11 | 4.0 |
| $TiO_2$ | | | 5.81 | 5.73 | |
| Coefficient of expansion (0–300° C.) | 24.3 | 40.3 | 19.7 | 29.8 | 37.1 |

The chemical composition, expressed in mole percent, for representative glasses of the invention are listed in Table III. The glasses designated as Examples 11 through 17 in said table were produced by melting and remelting as described supra.

TABLE III.—MOLE PERCENT

| Constituents | Example | | | | | | |
|---|---|---|---|---|---|---|---|
| | 11 | 12 | 13 | 14 | 15 | 16 | 17 |
| $SiO_2$ | 83.78 | 85.33 | 85.38 | 83.30 | 83.78 | 83.78 | 83.00 |
| $B_2O_3$ | 9.03 | 9.23 | 4.60 | 4.61 | 9.03 | 9.03 | 8.00 |
| BaO | 4.10 | 2.09 | 1.25 | 1.26 | 4.10 | 1.85 | 4.00 |
| $Al_2O_3$ | 3.48 | 3.15 | 3.14 | 3.15 | 3.08 | 1.34 | 1.50 |
| $Na_2O$ | | | | 2.07 | | 4.00 | 3.50 |
| $TiO_2$ | | | 5.62 | 5.62 | | | |
| Coefficient of expansion $\alpha \times 10^{-7}$ (0–300° C.) | 25.1 | 20.0 | 11.1 | 22.7 | 25.7 | 36.7 | 38.4 |

The instant formulation of the present glasses containing barium oxide to produce the instant glasses with low to medium expansion, with excellent melting characteristics and still transparent appears to be quite unexpected, for the prior art historically teaches against the addition of oxides of the second group of the periodic system into borosilicate type glasses. An example of this historic teaching may be found in U.S. Pat. No. 1,304,623. It is generally felt that the presence of oxides of bivalent elements in the borosilicate system tends to produce opalescence and tends to impair the structural stability of said glasses.

The glass compositions of the present invention may be used for the manufacture of items of commerce such as laboratory glassware, serum bottles, beakers, pill jars, instrument glass, glass tubing and like items of science and commerce.

While the illustrative embodiments of the invention have been described with particularity, it will be understood that various modifications will be apparent and can readily be made by those skilled in the art without departing from the scope and spirit of the invention.

We claim:

1. A transparent glass composition consisting essentially of 78 to 85 mole percent $SiO_2$, 4 to 9 mole percent $B_2O_3$, 1 to 7 mole percent BaO, 1 to 6 mole percent $Al_2O_3$, 1 to 5 mole percent $Na_2O$, and 0 to 6 mole percent $TiO_2$, said glass having a coefficient of thermal expansion of from 10 to $40 \times 10^{-7}$ per ° C. (0–300° C.).

2. A glass composition according to claim 1 consisting of 78 to 85 mole percent $SiO_2$, 4 to 9 mole percent $B_2O_3$, 1 to 7 mole percent BaO, 1 to 6 mole percent $Al_2O_3$, 1 to 5 mole percent $Na_2O$, and 1 to 6 mole percent $TiO_2$.

3. The transparent glass composition of claim 1 wherein said glass composition consists essentially of 81.69 mole percent $SiO_2$, 4.69 mole percent $B_2O_3$, 2.56 mole percent BaO, 3.21 mole percent $Al_2O_3$, 2.11 mole percent $Na_2O$, and 5.73 mole percent $TiO_2$.

4. The transparent glass composition of claim 1 wherein said glass composition consists essentially of 83.0 mole percent $SiO_2$, 9.0 mole percent $B_2O_3$, 2.5 mole percent BaO, 1.5 mole percent $Al_2O_3$, and 4.0 mole percent $Na_2O$.

5. A transparent glass composition consisting essentially of 78 to 85 mole percent $SiO_2$, 4 to 9 mole percent $B_2O_3$, 1 to 7 mole percent BaO, 1 to 6 mole percent $Al_2O_3$, 1 to 6 mole percent $TiO_2$, and wherein three times BaO+$TiO_2$ is equal to at least 6 mole percent, said glass having a coefficient of thermal expansion of from 10 to $40 \times 10^{-7}$ per ° C. (0–300° C.).

6. The transparent glass composition of claim 5 wherein said glass composition consists essentially of 82.73 mole percent $SiO_2$, 4.76 mole percent $B_2O_3$, 3.46 mole percent BaO, 3.25 mole percent $Al_2O_3$, and 5.81 mole percent $TiO_2$.

7. A transparent glass composition consisting essentially of 80 to 85 mole percent $SiO_2$, 4 to 7 mole percent $B_2O_3$, 1 to 4 mole percent BaO, 2 to 5 mole percent $Al_2O_3$, and 3 to 6 mole percent $TiO_2$, said glass having a coefficient of thermal expansion of from 10 to $40 \times 10^{-7}$ per ° C. (0–300° C.).

8. A transparent glass composition consisting essentially of 83.03 mole percent $SiO_2$, 11.56 mole percent $B_2O_3$, 4.08 mole percent BaO, and 1.34 mole percent $Al_2O_3$.

References Cited

UNITED STATES PATENTS

| 3,275,492 | 9/1966 | Herbert | 106—54 |
| 3,413,133 | 11/1968 | Stalego | 106—54 |

OTHER REFERENCES

Levin et al.: Structural Interpretation of Immiscibility in Oxide Systems: I, Analysis and Calculation of Immiscibility, J. Amer. Cer. Soc., vol. 40, pp. 95–106 (1957).

Levin et al.: Structural Interpretation of Immiscibility in Oxide Systems: III, Effect of Alkalis and Alumina In-ternary Systems, J. Amer. Cer. Soc., vol. 41, pp. 49–54 (1958).

HELEN M. McCARTHY, Primary Examiner